(12) United States Patent
Mitchell (10) Patent No.: US 12,031,285 B2
(45) Date of Patent: Jul. 9, 2024

(54) BARRIER SYSTEM

(71) Applicant: INNOVENTIVE SOLUTIONS PTY LTD, Queensland (AU)

(72) Inventor: Roger Mitchell, Queensland (AU)

(73) Assignee: INNOVENTIVE SOLUTIONS PTY LTD, Queensland (AU)

( * ) Notice: Subject to any disclaimer, the term of this patent is extended or adjusted under 35 U.S.C. 154(b) by 804 days.

(21) Appl. No.: 17/054,634

(22) PCT Filed: May 10, 2019

(86) PCT No.: PCT/AU2019/050435
§ 371 (c)(1),
(2) Date: Nov. 11, 2020

(87) PCT Pub. No.: WO2019/213713
PCT Pub. Date: Nov. 14, 2019

(65) Prior Publication Data
US 2021/0189675 A1    Jun. 24, 2021

(30) Foreign Application Priority Data
May 11, 2018   (AU) .................................. 2018901619

(51) Int. Cl.
*E02B 3/10*   (2006.01)
*E02B 3/16*   (2006.01)

(52) U.S. Cl.
CPC ................ *E02B 3/106* (2013.01); *E02B 3/16* (2013.01)

(58) Field of Classification Search
CPC ........... E02B 3/106; E02B 3/102; E02B 3/122
See application file for complete search history.

(56) References Cited

U.S. PATENT DOCUMENTS 4,439,064 A * 3/1984 van der Gaarden .... E04G 11/02
249/11
6,413,014 B1* 7/2002 Melin ..................... E02B 3/106
405/113

(Continued)

FOREIGN PATENT DOCUMENTS

DE   3527100 A1   2/1987
EP   0287510   * 10/1988

(Continued)

OTHER PUBLICATIONS

International Search Report and Written Opinion, mailed Jul. 25, 2019, for International Application No. PCT/AU2019/050435, 10 pages.

(Continued)

*Primary Examiner* — Sean D Andrish
(74) *Attorney, Agent, or Firm* — MUETING RAASCH GROUP (57) ABSTRACT

A barrier system comprising: an elongate and rigid base member having a channel defined by inner walls of the base member, the channel extending along the length of the base member, the rigid base member being adapted to be anchored to an underlying supporting surface wherein the channel comprises a relatively broader in-use lower portion with a first width (w1) and a relatively narrower in-use upper portion with a second width (w2) defining an opening into the channel; and a removable wall assembly adapted to be removably fastened relative to the base member, the removable wall assembly comprising a flexible barrier wall having a length and a height and being adapted to be positioned within the opening of the upper portion of the channel wherein the wall assembly comprises a frame assembly for framing the barrier wall, the flexible frame assembly further comprising a top frame member and a bottom frame member with the height of the flexible barrier wall extending ther- (Continued)

ebetween and wherein the bottom member is dimensioned to have a thickness that is less than or equal to w1 and that is greater than w2 for allowing the bottom member be received into the lower portion of the channel to position the flexible barrier wall in a substantially upstanding position and for simultaneously preventing the bottom member from being passed through the opening defined by the upper portion of the channel in an upwardly direction.

17 Claims, 8 Drawing Sheets

(56) References Cited

U.S. PATENT DOCUMENTS

| | | | |
|---|---|---|---|
| 7,690,865 B1 | 4/2010 | Stewart et al. | |
| 9,453,314 B2 * | 9/2016 | Cadogan | E06B 9/0692 |
| 2008/0247825 A1 | 10/2008 | Bonds | |
| 2015/0023733 A1 * | 1/2015 | Schnaars, Sr. | E02B 3/108 |
| | | | 405/115 |
| 2015/0096980 A1 | 4/2015 | Laing et al. | |
| 2016/0083918 A1 | 3/2016 | Cadogan et al. | |

FOREIGN PATENT DOCUMENTS

| | | |
|---|---|---|
| WO | WO 1998/037278 A1 | 8/1990 |
| WO | WO 98/37278 A1 | 8/1998 |
| WO | WO 2014/025323 A1 | 2/2014 |

OTHER PUBLICATIONS

International Preliminary Report on Patentability (Chapter II), mailed Dec. 2, 2019, for International Application No. PCT/AU2019/050435, 43 pages.

European Search Report and Search Opinion for EP Application No. 19800156.2, Jun. 1, 2021, 9 pages.

* cited by examiner

BARRIER SYSTEM

CROSS-REFERENCE TO RELATED APPLICATIONS

This application is the § 371 U.S. National Stage of International Application No. PCT/AU2019/050435, filed May 10, 2019, which claims the benefit of Australian Patent Application No. 2018901619, filed May 11, 2018, the disclosures of which are incorporated by reference herein in their entireties.

TECHNICAL FIELD

The present invention relates to a flood barrier system that is scalable in size, shape, and orientation to a wide variety of applications. The invention may be used to protect an area or building during floods. In other forms, the barrier system may also be used for containing water or other flowable solids (such as grains) in an enclosed area.

BACKGROUND

Any references to methods, apparatus or documents of the prior art are not to be taken as constituting any evidence or admission that they formed, or form part of the common general knowledge.

Increased damage from unpredictable weather events that lead to flooding has heightened the need for temporary flood control barriers which may be easily transported, quickly erected at the desired site and then disassembled when the need for flood protection is relieved. Residential and business areas with buildings of relatively high commercial value can be adversely affected by flooding. Civic authorities in flood prone regions have tried to address the issue by building levees and erecting dykes. However, such construction is expensive and not always effective in preventing flood damage.

The time available to provide at least temporary flood protection for structural developments in flood prone areas may range from hours to several days. For example, during the severe flooding of Brisbane, Australia in January 2011, the predicted flood levels or "crests", particularly downstream of the source of flooding, were available several days prior to the critical flood period. In this case, attempts to protect many structures in flood prone areas were unsuccessful in that sand bag barriers or temporary earthen dykes or levees were quickly breached once the flood waters impinged on these structures. However, even if permanent earthen levees or dykes were present, these structures would have been topped by the rising flood waters and efforts to increase the height of these levees using wooden planks, sandbags, or temporary sand or earth fill would have been largely unsuccessful.

The erection of sandbag and earth-fill barriers are labour and equipment intensive and time consuming and such structures can rapidly become saturated and structurally weakened to the point of failure. Still further, they create a problem with respect to removal after the flood-waters have subsided.

Currently available temporary (demountable) barriers usually comprise rigid barriers or semi-rigid connecting or interlocking components which are bulky to store, or fillable tubular bladders.

The erection of temporary barriers for containing toxic liquids or flowable solids such a grains for temporary storage is also highly desirable. In view of the above, it is desirable to provide a barrier system that addresses some of the shortcomings of the prior art.

SUMMARY OF INVENTION

In one aspect, the invention provides a barrier system comprising:
an elongate and rigid base member having a channel defined by inner walls of the base member, the channel extending along the length of the base member, the rigid base member being adapted to be anchored to an underlying supporting surface wherein the channel comprises a relatively broader in-use lower portion with a first width (w1) and a relatively narrower in-use upper portion with a second width (w2) defining an opening into the channel;
a removable wall assembly adapted to be removably fastened relative to the base member, the removable wall assembly comprising a barrier wall having a length and a height and being adapted to be positioned within the opening of the upper portion of the channel wherein the wall assembly comprises a frame assembly for framing the barrier wall, the frame assembly further comprising a top frame member and a bottom frame member with the height of the flexible barrier wall extending therebetween and wherein the bottom member is dimensioned to have a thickness that is less than or equal to w1 and that is greater than w2 for allowing the bottom member be received into the lower portion of the channel to position the flexible barrier wall in a substantially upstanding position and for simultaneously preventing the bottom member from being passed through the opening defined by the upper portion of the channel in an upwardly direction.

In an embodiment, the lower portion of the channel defines a substantially curved surface and wherein the bottom member comprises a corresponding curved surface such that during use, the curved outer surface of the bottom member engages the curved surface of the lower portion of the channel.

In an embodiment, the frame assembly is configured to allow the barrier wall to be rolled when the connecting arrangement is not received into the channel.

In an embodiment, the top frame member comprises:
a loop extending along the length of the top portion of the barrier wall; and
a line adapted to be passed through the loop, wherein during use the line is configured to be tensioned for maintaining the barrier wall in the upstanding position.

In an embodiment, the loop forms a part of the top frame member of the frame assembly.

In an embodiment, the system further comprises a tensioning arrangement for tensioning the line.

In an embodiment, the barrier system further comprises a plurality of barrier support assemblies adapted to be positioned at spaced apart locations along the length of the barrier wall, the support assemblies may be adapted to be coupled to the top frame member to support the barrier wall in a substantially upstanding position. The support assemblies may be coupled directly to the tensioning line as described above.

In an embodiment, the support assembly comprises oppositely arranged support members adapted to be positioned transversely relative to the wall assembly such that respective top portions of the support members are adapted to be connected to the top frame at said plurality of spaced locations.

In an embodiment, each of said support member comprises an adjustment mechanism for adjusting an in-use height of the support member.

In an embodiment, the support member comprises a telescopic arrangement to allow length of the support member to be adjusted.

In an embodiment, the respective top portions of each support member are adapted to be interlocked to each other.

In an embodiment, the support assembly further comprises a supporting wall extending transversely relative to the barrier wall, the supporting wall having a relatively narrower top part coupled to the top member of the frame assembly and a relatively broader bottom part coupled to a base of the support, the base of the support being adapted to be positioned on a supporting surface.

In an embodiment, the wall assembly further comprises spaced apart lateral frame members with the length of the flexible barrier wall extending therebetween.

In an embodiment, the barrier system comprises a plurality of said wall assemblies and said base members interconnected with each other to define an enclosed area, the system further comprising one or more joining members for interconnecting two adjacently located base members and two adjacently located wall assemblies.

In an embodiment, the joiner member is structured to fasten a first wall assembly and a second wall assembly such that a plane of the barrier wall of the first wall assembly intersects a plane of the barrier wall of the second wall assembly thereby allowing adjacent wall assemblies to be positioned in an angled configuration.

In an embodiment, the joiner member is structured to fasten a first wall assembly and a second wall assembly such that a plane of the barrier wall of the first wall assembly is co planar with a plane of the barrier wall of the second wall assembly thereby allowing adjacent wall assemblies to be positioned alongside each other.

In an embodiment, an upper portion of the joiner member is adapted to receive respective lateral frame members from adjacent wall assemblies and wherein a lower portion of the joiner member is adapted to be positioned in between the two adjacently located base members.

In an embodiment, the barrier system further comprises a bollard assembly configured to receive and store the wall assembly in a stowed configuration, the bollard assembly comprising a fastening arrangement to allow the bollard assembly to be fastened to the base member.

In an embodiment, the bollard assembly comprises a bollard housing with a roller mechanism positioned in the housing, the roller mechanism comprising a drum around which the flexible wall assembly can be wound to allow the flexible wall assembly to be stowed during periods of non-use.

In an embodiment, the bollard assembly further comprises a receiving arrangement for receiving and fastening a lateral side portion of the wall frame assembly.

In an embodiment, the base member is adapted to be permanently fastened to the underlying surface.

In an embodiment, the base member comprises a guide opening positioned at one or both lateral ends of the channel to allow insertion of the base member of the wall assembly into the lower portion of the channel.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
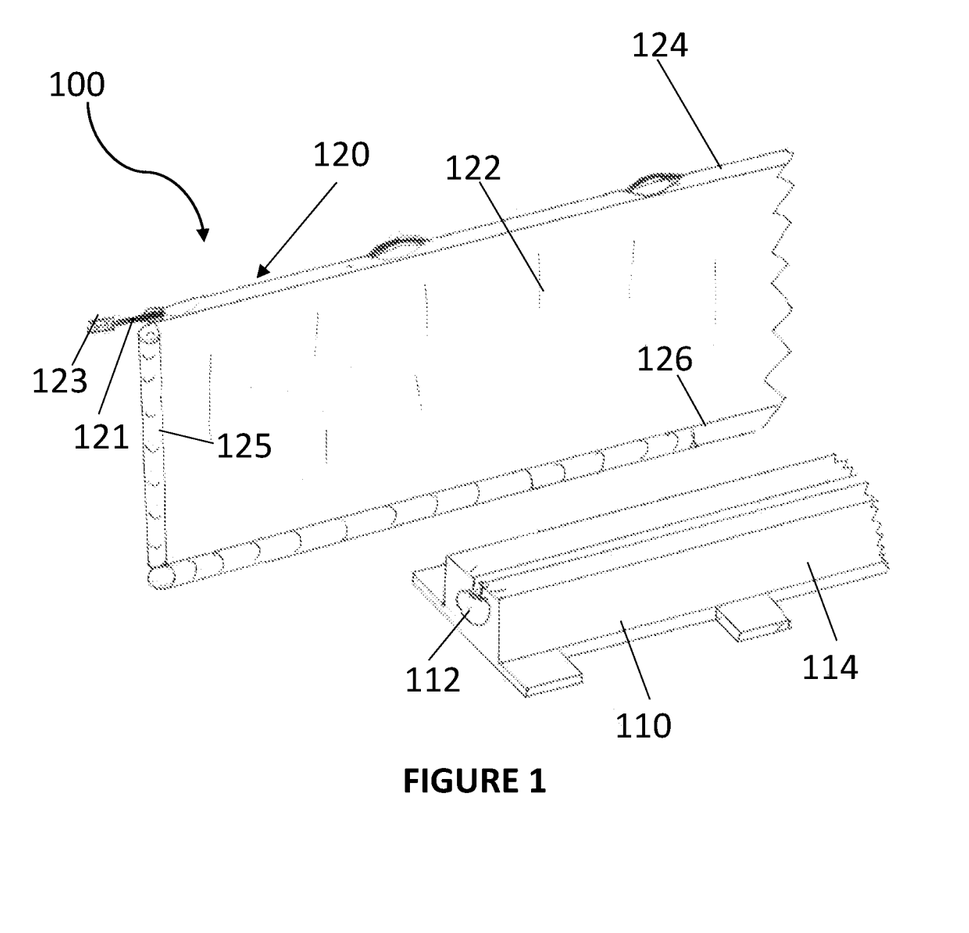
FIG. 1 is a partial exploded view (left hand side perspective) of the barrier system 100 in accordance with a first embodiment of the present invention.
Figures 2A, 2B:
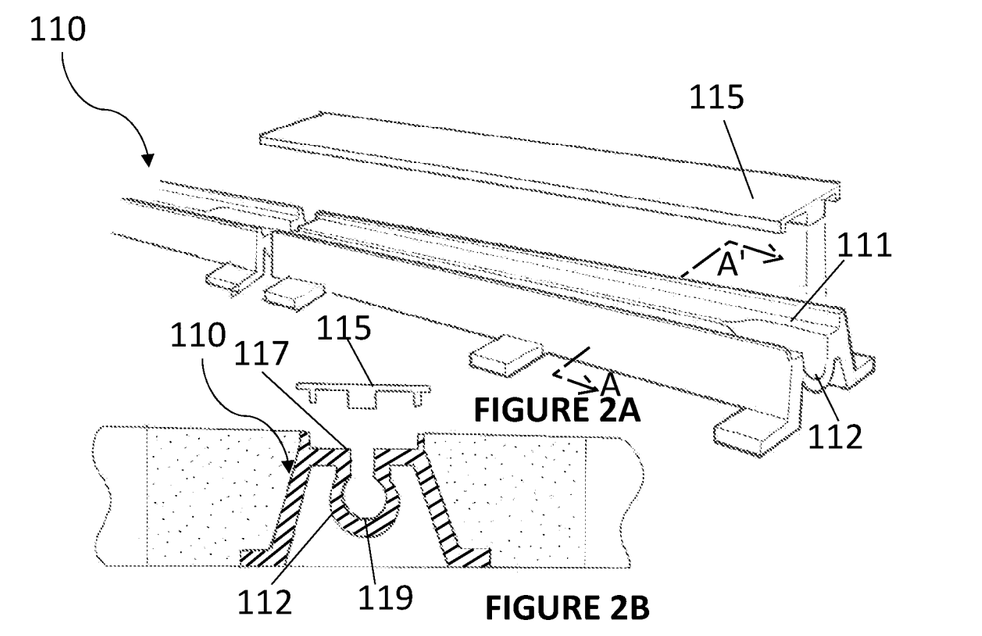
FIG. 2B is a sectional view of the base member 110 taken across line A-A' positioned within ground material.
Figure 2C:
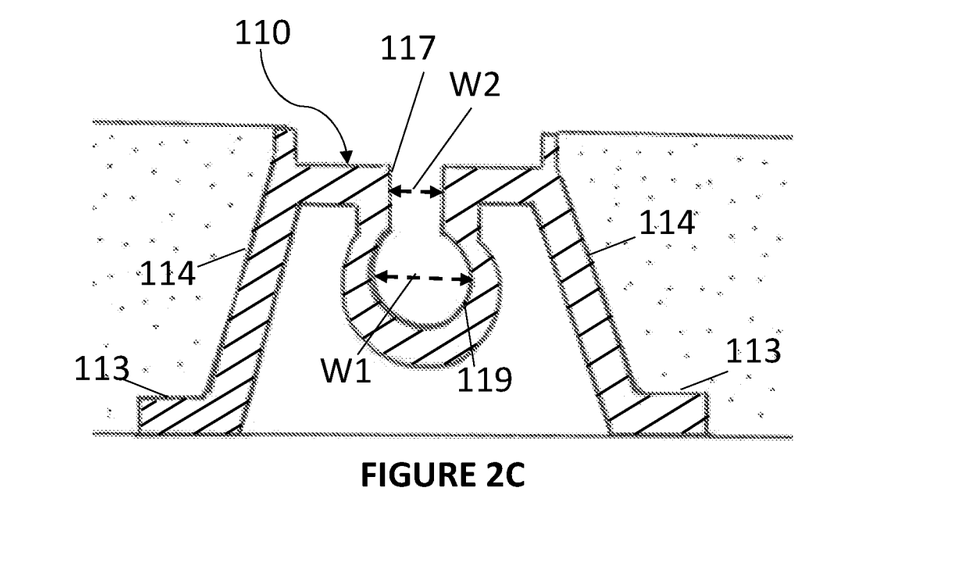
FIG. 2C is an enlarged view of the base member 110 taken across line A-A' positioned within ground material.
Figure 3:
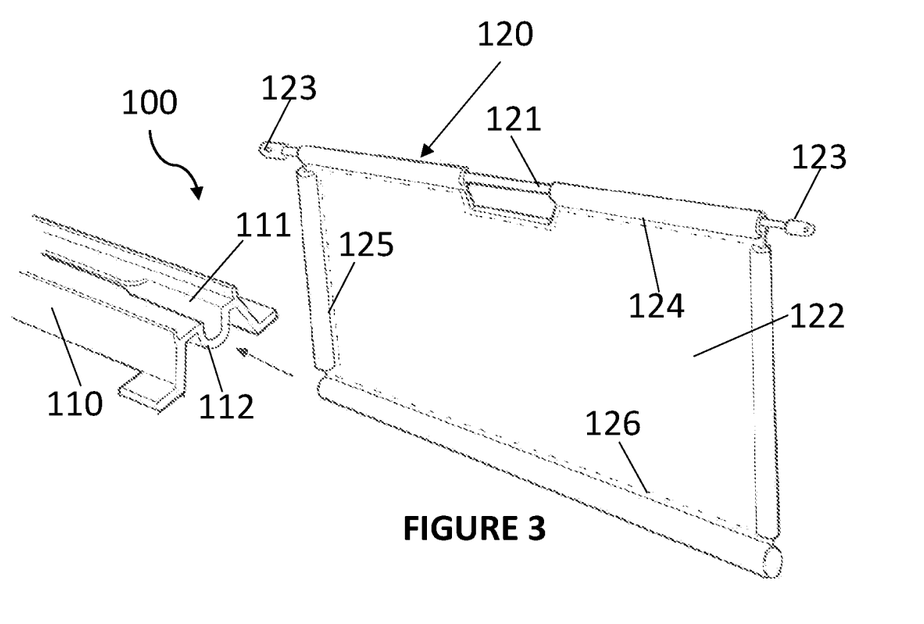
FIG. 3 is a partial exploded view (right hand side perspective) of the barrier system 100.

Referring to FIGS. 1 to 3, a barrier system 100 for flood control in a confined area is illustrated. The barrier system 100 comprises of two main parts that can be optionally assembled together when a flooding event is imminent. At least one of these parts may be uncoupled and stowed away during other periods. The following passages will provide a detailed explanation of how the barrier system 100 can readily assembled during flood events and easily uncoupled and stowed away during other periods.

Figure 14:
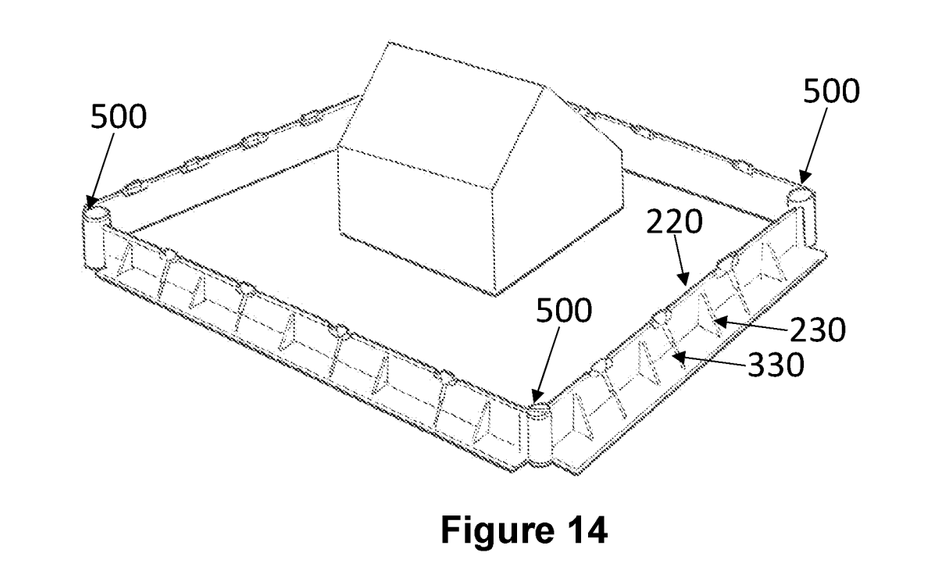
FIG. 14 is an in-use perspective view of the barrier system 200 being used for preventing flooding of an area surrounding a house or a building. The system 200 may also be used for containing a spill or leak from a storage location such as a warehouse.

In a first preferred embodiment, the barrier system 100 includes a rigid and elongate base member 110 (of indefinite length) that may be positioned around a perimeter of a house or a building that requires to be protected from flooding (as shown in FIG. 14). The base member 110 is structured to be anchored to an underlying supporting surface. In the preferred embodiment, the inventor has envisioned that the base member 110 may be positioned in a shallow trench dug around the perimeter of the house or dwelling and be anchored and positioned within the trench such that a substantial part of the base member 110 is hidden from plain view. Such a configuration of the base member 110 may be considered to be structurally similar to a trench drain assembly. The inventor believes that concealing the base member 110 thereby alleviating the need to remove the base member 110 when the barrier system 100 is not being used.

Unlike many other barrier systems of the prior art that use heavy and bulky structures that are difficult to install and remove, the base member 110 of the present embodiment only needs to be installed once by way of anchoring the base 110 within a trench dug around the perimeter of the house or building being protected. Once anchored, the base member 110 can be left in a permanently installed position without the need to be removed. Referring to FIGS. 2B and 2C, a sectional view of the base member 110 has been shown in an in-use configuration wherein the base member 110 has been installed below ground level. In other optional embodiments, the base member 110 may be modified to allow the modified base member to be anchored onto the supporting surface without being positioned in a trench. Preferably, the base member 110 is entrenched such that the top surface of the base member 110 is substantially flush with the ground. As a result, the base member 110 does not present a barrier for vehicles or pedestrians to cross when not in use in the stowed position.

The base 110 is also provided with a channel 112 extending along the length of the elongate base 110. This channel 112 is structured to have sufficient depth that allows at least a part of a wall assembly 120 to be received into the channel 112 when the barrier system 100 needs to be installed in a flood preventing configuration. Such a configuration requires the wall assembly 120 to be positioned in a substantially upstanding configuration. The base 110 also comprises a top wall and outer side walls 114 that extend along the length of the base 110. Outwardly extending feet 113 that extend outwardly from the outer side walls 114 are also provided to support the base member 110 upon a supporting surface.

The wall assembly 120 includes a flexible barrier wall 122 having a length and a height with a connecting arrangement provided in the wall assembly 120 to allow the wall assembly 120 to be easily received into the channel 112 of the base 110 in order to position the flexible barrier wall 122 in a substantially upstanding position to prevent flooding of an area adjacent the barrier wall 122. The main advantage of providing a flexible barrier wall 122 is that the barrier wall 122 can be easily rolled away and stored easily once uncoupled from the base 110 as will be explained in further detail in the foregoing sections. The additional covering (such as but not limited to the cover-strip 115 shown in FIG. 2) may also be positioned above the base member 110 for covering the channel 112 to prevent any contaminants from falling into the channel 112 when the channel 112 is not in use ie. when the barrier assembly 120 has been uncoupled from the base 110.

Referring to FIGS. 1 and 3, the wall assembly 120 includes a top frame member 124 and a bottom frame member 126 with the height of the barrier wall 122 extending therebetween such that the connecting arrangement for positioning the wall assembly 120 in the channel 112 is provided along the bottom frame member 126 to allow a portion of the bottom frame member 126 to be readily received into the channel 112 of the base member 110 during use. The connecting arrangement in the wall assembly 120 comprises a tube-shaped configuration for the bottom frame member 126 that allows the tube-shaped bottom frame member 126 to be received into and retained within a lower portion of the channel 112 when the flexible barrier wall assembly 120 has been stowed away.

Referring to FIGS. 2A to 2C, the channel 112 in the base 110 is also provided with a relatively narrower mouth portion 117 with a width w2 that is located directly above the relatively broader and larger bottom portion 119 of the channel 112 having a width w1 which is sized for receiving the tube-shaped bottom frame member 126 of the wall assembly 120. In the preferred embodiment, the bottom channel portion 119 defines a curved surface that is adapted to engage a corresponding curved surface of the bottom frame member 126. The unique configuration of the channel 112 allows the bottom frame member 126 be received into the lower portion 119 of the channel 112 to position the flexible barrier wall 122 in a substantially upstanding position and for simultaneously preventing the bottom member 126 from being passed through the opening defined by the upper portion 117 of the channel in an upwardly direction. Such a novel configuration of the channel 112 ensures that the wall assembly 112 is not inadvertently withdrawn out of the channel 112 when forces are acting in an upwardly direction. As explained earlier, the system 100 is for providing an improved flood barrier It is also important to note that, during use, as the water level adjacent the flexible barrier wall 122 starts rising, the hydrostatic pressure increases which may exert pulling forces on the bottom frame member 126 in an upward direction towards the upper portion/roof the of the channel 112. This pulling force also results in the curved surface of the bottom member 126 being pushed against the curved walls of the lower channel portion 119 resulting in a self-sealing effect. The reduced width w2 of the upper channel portion 117 ensures that that the bottom member 126 of the frame assembly is retained in the channel 112. In this regard, the bottom member 126 may be formed from a resilient or flexible material to be sufficiently rigid to form a seal with the walls of the channel 112 whilst being sufficiently flexible to allow the bottom frame member 126 to flex during use.

The unique narrow mouth configuration of the channel 112 also allows the cover 115 to be plugged into and fastened with the walls defining the opening of the narrower channel portion 117 when the wall assembly 120 is not being used.

One of the possible ways of coupling the wall assembly 120 from the base member 110 is to impart relative axial movement between the wall assembly 120 and the base member 110 (shown by the arrow in FIG. 3) and withdraw the wall assembly 120 from one of the two ends of the base 110. By way of example, if we refer to FIGS. 2A and 3, the bottom frame member 126 is inserted into the channel 112 by sliding the bottom frame member 126 in axial direction of the channel 112 via a guide opening 111 which has a slightly broader opening to allow easy insertion of the bottom member 126 into the channel 112. The guide opening 111 may be provided on one of the ends of the base member 110 (as shown in FIGS. 1 to 3) or in alternative embodiments two guide openings 111 may be provided at either end of the base member 110.

Referring to FIGS. 1 and 3, the top frame member 124 comprises a loop extending along the length of the top portion of the barrier wall 122. A flexible line 121 (such as a metallic cable with sufficient tensile strength) passes through the loop of the top frame member 124. The insertion of the line 121 into the loop of t the top frame member 124 provides structural support along the length of the top portion of the wall assembly 120. During use, the tension in the line 121 may be varied by using a tension adjuster 123 to easily adjust tension in the line 121 in order to maintain the upper portion of the barrier wall 122 in an upright position during use. In at least some embodiments, the tension adjuster 123 may be useful for inter-connecting separate tensioning lines 121. By way of example, if the two ends of the barrier assembly 120 are connected to respective additional barrier members 120 or any other structures that may or may not form part of the presently described barrier system 100 then such a tension adjuster may include additional coupling arrangements for forming such inter-connections. The upper and lower members 124 and 126 may be permanently attached to the flexible barrier wall 122 and may be rolled up with the upper and lower members 124 and 126 when not in use. The flexible line 121 may also be rolled up along-with the wall assembly and may not be withdrawn out of the loop of the top frame member 124.

The wall assembly 120 also includes spaced apart lateral frame members 125 at either lateral end of the of the wall assembly 120 (as shown in FIG. 1). As discussed in the earlier sections, the wall assembly 120 is adapted to allow the barrier wall 122 to be easily rolled length-wise in between the lateral frame members 125 such that once the lower frame member 126 is withdrawn out of the channel 112 for the base 110, the barrier wall can be easily rolled and put away in storage.

Figures 4, 4A, 4B:
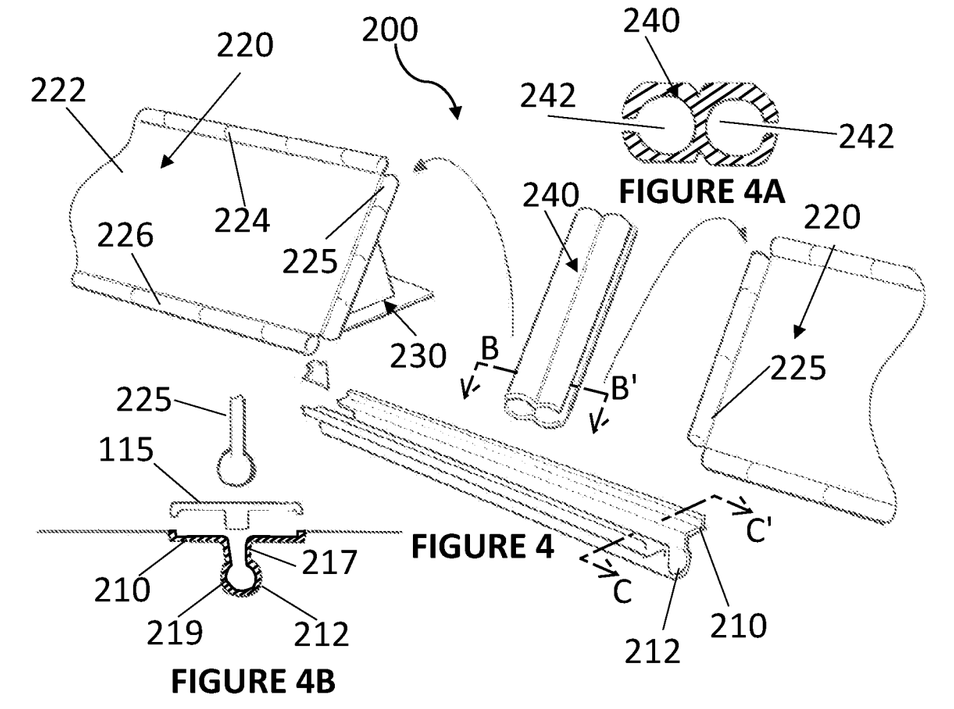
FIG. 4 is an exploded view of a barrier system 200 in accordance with a second embodiment.
FIG. 4A is a sectional view of a joiner member 240 that forms a part of the barrier system 200 taken across line B-B'.
FIG. 4B is a sectional view of the barrier system 200 taken across line C-C'.
Figure 5:
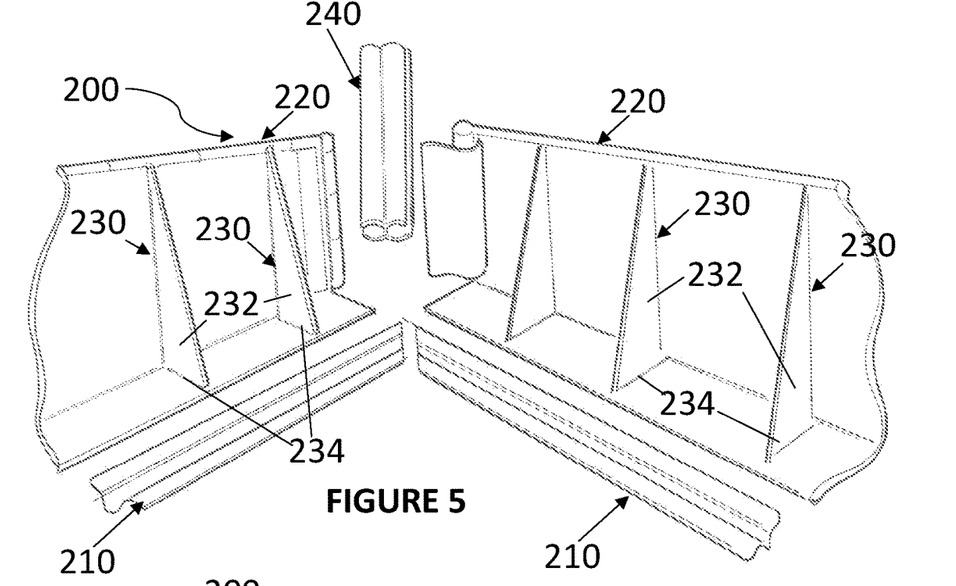
FIG. 5 is a perspective view of the barrier system 200 using a comer joiner member 240 to position two wall assembles 220 at substantially right angles to each other.
Figures 6, 6A:
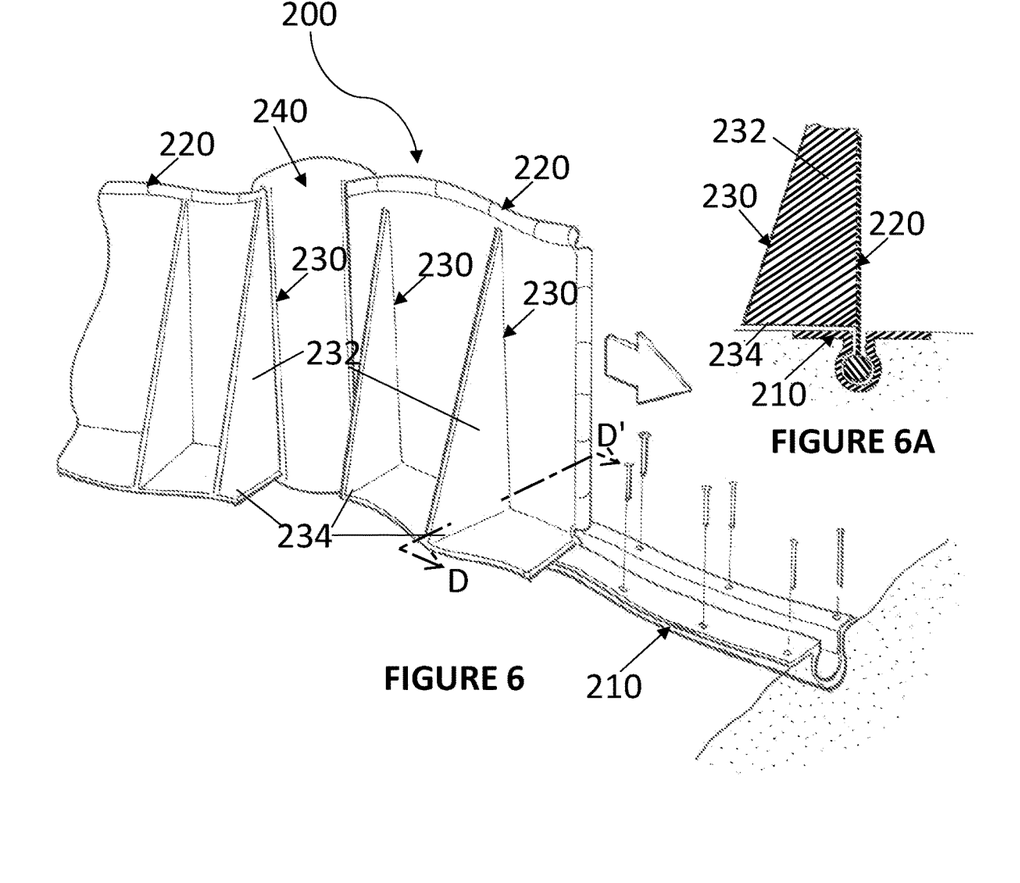
FIG. 6 is a perspective view of the barrier system 200 using a joiner member 240 to position two wall assemblies 220 alongside each other.
FIG. 6A is a sectional view of barrier system 200 and joiner member 240 taken across line D-D'.

FIGS. 4 to 6 illustrate a second embodiment of a barrier system 200 that uses a base member 210 which has an alternative structural configuration when compared with the base member 110 from the previously described barrier system 100. The main difference between the base member 210 when compared with base member 110 is that base member 210 does not include outer walls that depend downwardly from a top portion of the base member 210. Instead, the base member 210 includes outwardly extending lateral wall portions with ends that that sit flush on ground level when installed into a trench and suspend the channel 212 into the trench. As shown in FIG. 6, pegs or other types of fasteners may be used for fastening the base member 210 onto the ground during installation of the base 210.

The base member 210 includes a channel 212 which has structural configuration that is similar to channel 112 as has been previously described. Specifically, the channel 212 includes a narrower top portion 217 and a broader bottom channel portion 219 that has a curved surface that can abut a corresponding curved surface of a bottom member 226 of the wall assembly 220. The wall assembly 220 also includes a top frame member 224 and a bottom frame member 226 with the height of the barrier wall 222 extending therebetween such that the connecting arrangement for positioning the wall assembly 220 in the channel 212 is provided along the bottom frame member 226 to allow a portion of the bottom frame member 226 to be readily received into the channel 212 of the base member 210 during use. The connecting arrangement in the wall assembly 220 also comprises a tube-shaped configuration for the bottom frame member 226 that allows the tube-shaped bottom frame member 226 to be received into and retained within a lower portion of the channel 212 when the flexible barrier wall assembly 220 has been erected in an upstanding position.

During use, the upstanding wall assembly 220 is further supported by one or more support assemblies 230. Each support assembly 230 comprises a triangular supporting wall 232 extending transversely relative to the barrier wall 222. The supporting wall 232 comprises a relatively narrower top part that forms the apex of the triangular wall 232 and is coupled to the top member 224 of the wall frame assembly 220. The supporting wall 232 also includes a relatively broader bottom part coupled to a base 234 of the support assembly 230 which is adapted to be positioned on the ground. A number of such support assemblies 230 may be positioned one side or both sides of the barrier wall assembly 220 to provide additional support to the wall assembly during use. The support assembly 230 may either be integrally formed with the flexible barrier wall 222 or in other embodiments the support assembly 230 may be provided in the form of discrete supporting members that are positioned adjacent to the wall assembly 120 (once erected) to provide additional support if required (not shown).

Referring to FIGS. 4 to 6, the barrier system 200 also comprises a joining member 240 that can be used to join two separate wall assemblies 220 along their lateral frame members 225. The joining member 240 is also adapted to be coupled to two adjacently located base members 210. The joining member 240 is provided to form a continuous inter-connected barrier system that can be easily used to interconnect wall assemblies at various angles. For example, in FIG. 5, the joining member 240 is structured or shaped to inter-connect two wall assemblies at right angles to one another. Each joiner member 240 includes two upright channels 242 located at either lateral end of the joiner member 240. Each of the upright channels 242 is configured to receive a lateral frame member 225 from a respective wall assembly 220 thereby allowing two wall assemblies of the barrier system 200 to form a continuous flood barrier along a length of the perimeter of the area being protected from floods. Similarly FIG. 4 shows the joiner member 240 being shaped to include two channels 242 that allow two wall assemblies 220 to be positioned in a co-planar manner. In some embodiments, the joiner member 240 may have a base that could be coupled to the base member 210. In alternative embodiments, the joiner member 240 may be adapted to be positioned on and coupled to the ground without being directly coupled to the base member 210.

The wall assembly 220 also includes spaced apart lateral frame members 225 at either lateral end of the of the wall assembly 220 (as shown in FIG. 4). As discussed in the earlier sections, the wall assembly 220 is adapted to allow the barrier wall 222 to be easily rolled length-wise in between the lateral frame members 225 such that once the lower frame member 226 is withdrawn out of the channel 212 for the base 210, the barrier wall can be easily rolled and put away in storage.

Figures 7, 7A:
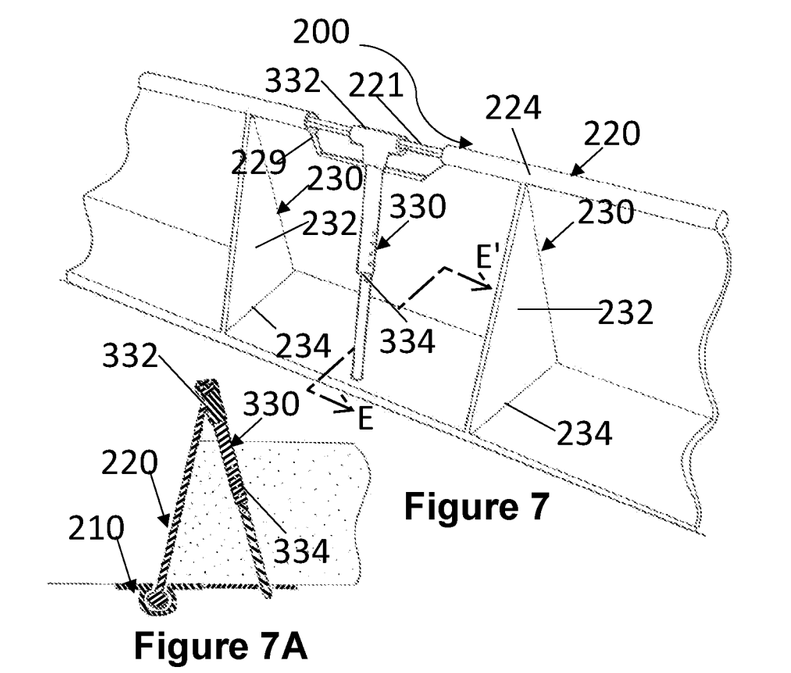
FIG. 7 shows the use of an additional support assembly 330 for the barrier system 200.
FIG. 7A is a sectional view of the additional support assembly 330 taken across line E-E'.

Referring to FIGS. 7 and 7A, an additional support assembly 330 is shown for use with the barrier system 200. Once again, the support assembly 330 provides additional support to the erect barrier wall assembly 220 and prevent the wall assembly 220 from collapsing during periods when water is applying pressure against the barrier wall 222 during a flood event. Each additional support assembly 330 includes an upper portion 332 that can be coupled to a top frame member 224 of the wall assembly 220 and an extendable leg portion 334. In this instance, the additional support assembly 330 may be directly coupled to the tensioning line 221 passing through the loop formed in the top frame member 224. The plurality of the additional support assemblies 330 may be positioned transversely relative to the wall assembly 220 such that respective top portions 332 of the additional support assemblies 330 can be easily connected to the top frame 224 at a plurality of spaced locations along the top frame 224. In the preferred embodiments, the leg 334 is telescopic and allows the length of the leg to be adjusted so that the additional support assembly 330 can be positioned on undulating surface.

Figures 8, 8A, 8B:
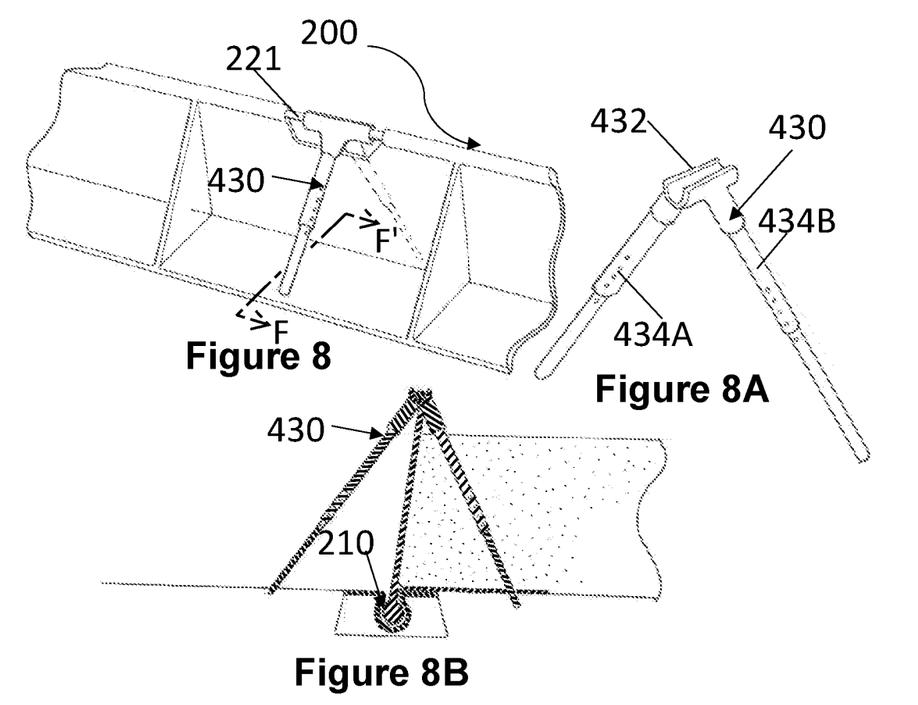
FIG. 8 is a perspective view of another embodiment of an additional support assembly 430 for the barrier system 200.
FIG. 8A is an isolated perspective view of the additional support assembly 430.
FIG. 8B is a sectional view of the additional support assembly 430 taken across line F-F'.
Figure 9:
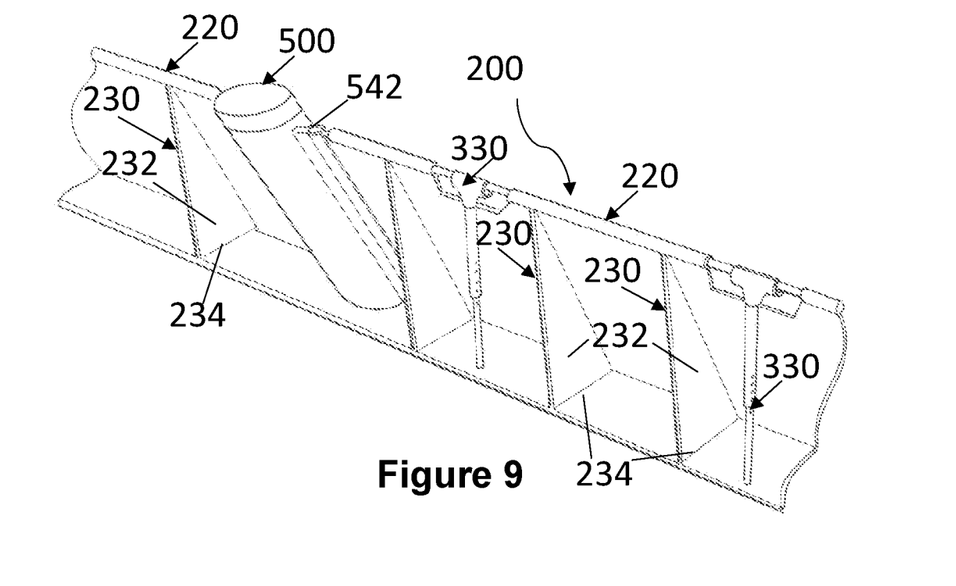
FIG. 9 is a perspective view of a bollard assembly 500 shown in use with the barrier system 200.

Referring to FIGS. 8, 8A and 8B, another embodiment of the additional support assembly 430 has been illustrated for use with system 200. Like reference numerals denote like features that have been previously disclosed. Each of the additional support assemblies 430 includes a pair of supporting members that are joined together at an upper portion 432 with telescopic legs 434A and 434B depending in mutually opposed downwardly direction. Once again, upper portion 432 of each additional support assembly 430 may be coupled with the tensioning line 221 located in the loop that forms a part of the top frame 224 of the wall assembly 220 as shown in FIG. 8. In the preferred embodiments, the legs 434A and 434B are telescopic which allows the length of each leg to be adjusted so that the additional support assembly 430 can be positioned on an uneven surface.

It is important to note that each of the top portions of the respective support assembly 330 or 430 may be passed through a cut-out opening 229 provided in the loop of the top frame member 224. As a result, the support assembly 330 or 430 supports the flexible barrier wall 222 to maintain the barrier assembly 220 in a substantially upstanding position. A retaining arrangement may be provided on the respective upper portions 332 or 432 to secure the tensioning line 121 to the upper portion 332 or 432 of the support assemblies 330 or 430.

Figure 10:
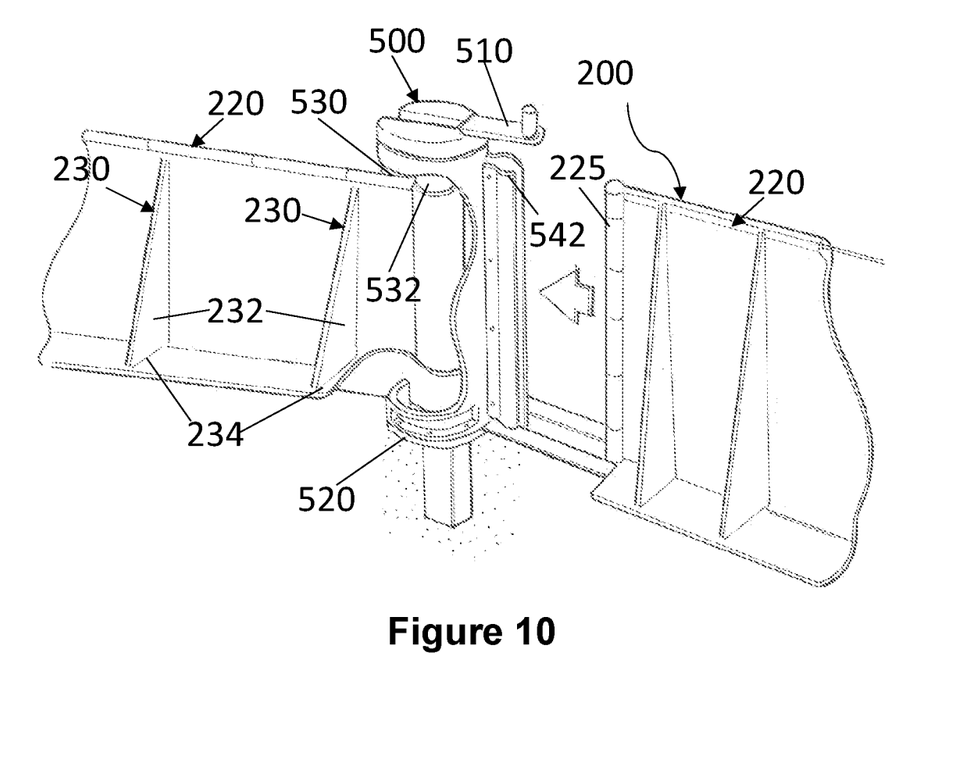
FIG. 10 is a perspective partial cutaway view of the bollard assembly 500 shown in use with the barrier system 200.

Referring to FIGS. 9 to 14, the system 200 may further include a bollard assembly 500. Referring to FIG. 10, the bollard assembly 500 comprises a bollard housing 530 housing with a roller mechanism positioned in the housing. The roller mechanism comprises a drum 532 around which the flexible wall assembly 220 can be wound to allow the flexible wall assembly to be stowed during periods of non-use whilst the bollard is positioned upon the base member 210. The bollard assembly 500 is configured to receive and store the wall assembly 220 in a stowed configuration whilst being fastened either to the base member 210 or to an underlying surface by a fastening arrangement 520 the bollard assembly comprising a fastening arrangement to allow the bollard assembly to be fastened to the base member 210 and be positioned in a substantially upright position. The roller may be mechanically driven by a hand held roller handle 510. In alternative embodiments, the roller may also be driven using a motor.

The bollard housing 530 also comprises a channel 542 that runs along the height of the bollard housing 530. The placement of the channel 542 allows the channel 542 to receive a lateral frame 225 and allow the deployment of a wall assembly 220 into a substantially upstanding position. In this manner, the bollard assembly 500 functions not only as a storage device for stowing the rolled wall assembly but also as a joiner member to join adjacently positioned wall assemblies 220.

Figure 11:
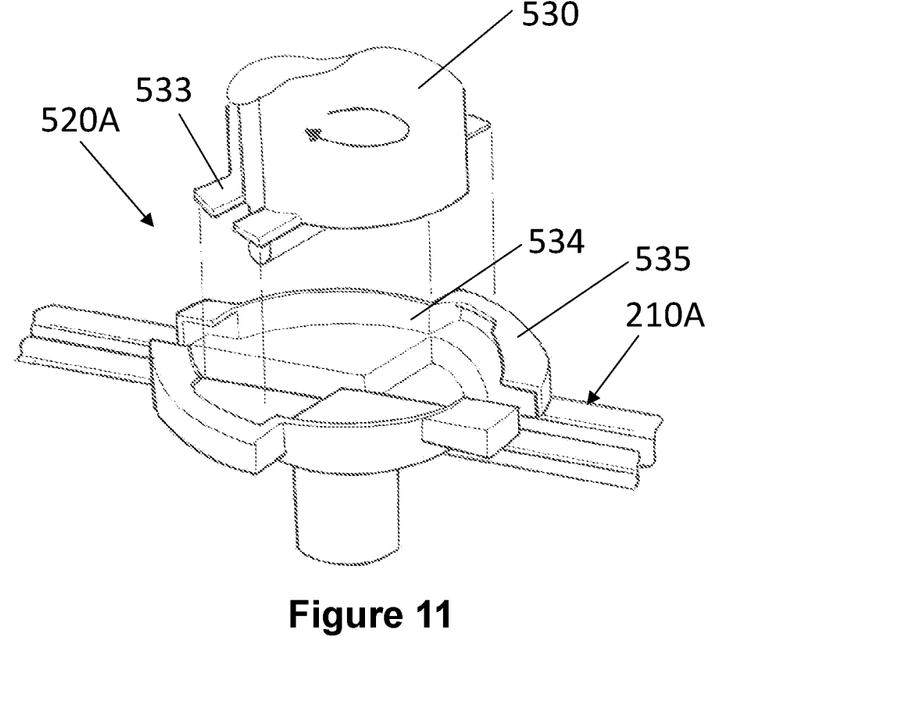
FIGS. 11 and 12 show perspective views for fastening arrangement 520A and 520B used for positioning the bollard assembly 500.
Figure 12:
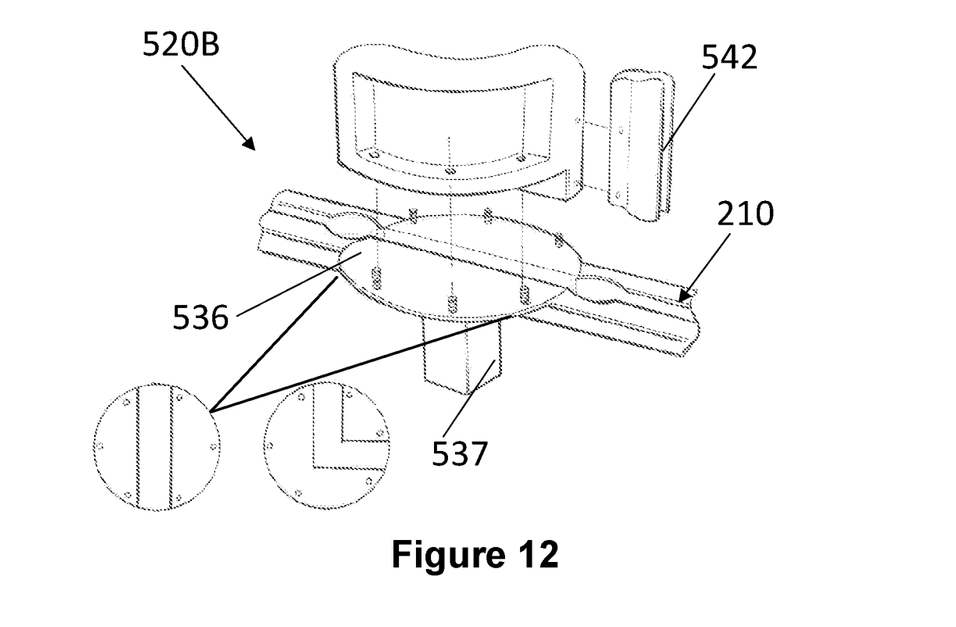
Figure 13:
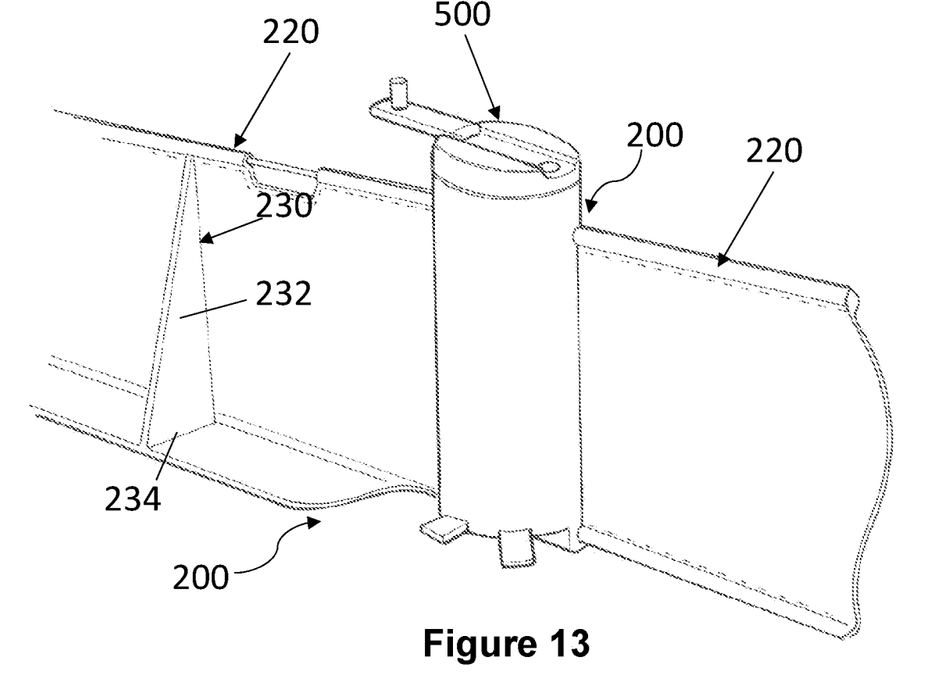
FIG. 13 is an in-use perspective view of the barrier system 200 incorporating the bollard assembly 500.

FIGS. 11 and 12 provide two alternative embodiments for fastening the bollard housing 530 onto the base member (denoted by 210). Like reference numerals denote like features that have been previously described. The first fastening arrangement 210A shown in FIG. 11 comprises a bayonet lock connecting arrangement that allows the bayonet pins 533 on the bollard housing 530 to be locked into a circular channel 534 of a socket 535. The bayonet design is not intended to be a single geometry element that unto itself is design critical to the operation concept of this mechanism. Alternate methodology may be used to facilitate securement of the bollard housing 530 to the base member 210. The second alternative type of fastening arrangement 520 B (as shown in FIG. 12) comprises a base plate 536 with a spigot 537. The base plate 536 may be positioned flush with the ground level and/or one or more base members 210 with the spigot portion 537 being driven into the ground. A lower portion of the bollard housing 530 may be fastened to the base plate 536 by way of fasteners such as screws or bolts. The two smaller circles illustrate screw/bolt placement for a bollard housing 530 connected to straight, or in-line, wall assemblies (the left circle) and screw/bolt placement for a bollard housing 530 connected to a corner, or angle, between wall assemblies (the right circle).

Turning to FIG. 14, a perspective in-use view of the barrier system 200 has been shown. The barrier 200 has been constructed by inter-connecting several wall assemblies 220 with each other by using four bollard assemblies 500. A typical installation process would involve unfurling the flexible barrier wall 222 in a lengthwise direction and positioning the lower frame member 226 for each wall assembly 120 into the channel 212 of the base members 210 anchored along the perimeter of the house. At each of the four corners of the area to be protected, the bollard assemblies 500 are positioned to inter-connect the wall assemblies 220 in a continuous manner. Support assemblies 230, 330 and 430 have also been shown in use. The support assemblies 230, 330, 430 extend transversely from the barrier wall assemblies 220 in a manner as previously described to provide additional support to the erected wall assembly 220 during periods of flooding. It will be understood that the system 200 is in no way limited to using a plurality of barrier assemblies 220. For example, a single continuous barrier assembly 220 may be coupled with one or a plurality of base members 110 for forming a continuous barrier wall without departing from the spirit and scope of the invention.

The presently described embodiments of the barrier systems 100 or 200 refers to use during floods. However, such use is not limiting and the barrier system 100 in accordance with other embodiments may be utilised for containment of toxic chemical either in liquid or solid form or other materials such as grains within a confined space. The use of the barrier systems 100 and 200 is not limited to being used to confine a given area. By way of example. The systems 100 or 200 may be positioned across a door opening in a building to prevent water from entering the house during a flooding event.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A barrier system comprising:
   an elongate and rigid base member having a channel defined by inner walls of the rigid base member, the channel extending along a length of the rigid base member, the rigid base member being adapted to be anchored to an underlying supporting surface wherein the channel comprises a relatively broader in-use lower portion with a first width (w1) and a relatively narrower in-use upper portion with a second width (w2) defining an opening into the channel;
   a removable wall assembly adapted to be removably fastened relative to the rigid base member, the removable wall assembly comprising a flexible barrier wall having a length and a height and being adapted to be positioned within the opening of the upper portion of the channel wherein the removable wall assembly comprises a frame assembly for framing the flexible barrier wall, the frame assembly further comprising a top frame member and a bottom frame member with the height of the flexible barrier wall extending therebetween and wherein the bottom frame member is dimensioned to have a thickness that is less than or equal to said first width (w1), wherein the first width (w1) is greater than said second width (w2) for allowing the bottom frame member to be received into the lower portion of the channel in a connecting arrangement to position the height of the flexible barrier wall in a substantially upstanding position and for simultaneously preventing the bottom frame member from being passed through the opening defined by the upper portion of the channel in an upwardly direction, and wherein the lower portion of the channel defines a substantially curved surface and the bottom frame member comprises a corresponding curved surface such that during use, the corresponding curved surface of the bottom frame member engages the curved surface of the lower portion of the channel, wherein the top frame member comprises:
   a loop extending along a length of the top portion of the barrier wall; and
   a line adapted to be passed through the loop, wherein during use the line is configured to be tensioned for maintaining the barrier wall in the substantially upstanding position,
   wherein the frame assembly is configured to allow the flexible barrier wall to be rolled when the bottom frame member is not in the connecting arrangement with the lower portion of the channel, and
   wherein the frame assembly is configured to be rolled with the flexible barrier wall.

2. The barrier system in accordance with claim 1 further comprising a tensioning arrangement for tensioning the line.

3. The barrier system in accordance with claim 1 further comprising a plurality of barrier support assemblies adapted to be positioned at spaced apart locations along the length of the flexible barrier wall, the barrier support assemblies adapted to be coupled to the top frame member to support the flexible barrier wall in a substantially upstanding position.

4. The barrier system in accordance with claim 3 wherein each of said plurality of barrier support assemblies comprises support members adapted to be positioned transversely relative to the removable wall assembly such that respective top portions of the support members are adapted to be connected to the top frame member at said plurality of spaced locations.

5. The barrier system in accordance with claim 4 wherein each of the support members comprises an adjustment mechanism for adjusting an in-use height of each of the support members.

6. The barrier system in accordance with claim 4 wherein the support members each comprise a telescopic arrangement to allow a length of each of the support members to be adjusted.

7. The barrier system in accordance with claim 3 wherein each of said barrier support assemblies further comprises a supporting wall extending transversely relative to the flexible barrier wall, the supporting wall having a relatively narrower top part coupled to the top member of the frame assembly and a relatively broader bottom part coupled to a base of said barrier support assembly, the base of said barrier support assembly being adapted to be positioned on a supporting surface.

8. The barrier system in accordance with claim 1 wherein the removable wall assembly further comprises spaced apart lateral frame members with the length of the flexible barrier wall extending therebetween.

9. The barrier system in accordance with claim 1 comprising a plurality of said removable wall assemblies and said rigid base members interconnected with each other to define an enclosed area, the system further comprising one or more joining members for inter-connecting two adjacently located rigid base members and two adjacently located removable wall assemblies.

10. The barrier system in accordance with claim 9 wherein each of said joining members is structured to fasten a first removable wall assembly and a second removable wall assembly such that a plane of the flexible barrier wall of the first removable wall assembly intersects a plane of the flexible barrier wall of the second removable wall assembly thereby allowing adjacent removable wall assemblies to be positioned in an angled configuration.

11. The barrier system in accordance with claim 9 wherein each of said joining members is structured to fasten a first removable wall assembly and a second removable wall assembly such that a plane of the flexible barrier wall of the first removable wall assembly is coplanar with a plane of the flexible barrier wall of the second removable wall assembly thereby allowing adjacent removable wall assemblies to be positioned alongside each other.

12. The barrier system in accordance with claim 9 wherein an upper portion of each said joining members is adapted to receive respective lateral frame members from adjacent removable wall assemblies and wherein a lower portion of each of said joining members is adapted to be positioned in between the two adjacently located rigid base members.

13. The barrier system in accordance with claim 1 further comprising a bollard assembly configured to receive and store the removable wall assembly in a stowed configuration, the bollard assembly comprising a fastening arrangement to allow the bollard assembly to be fastened to the rigid base member.

14. The barrier system in accordance with claim 13 wherein the bollard assembly comprises a bollard housing with a roller mechanism positioned in the bollard housing, the roller mechanism comprising a drum around which the flexible wall assembly can be wound to allow the flexible wall assembly to be stowed during periods of non-use.

15. The barrier system in accordance with claim 13 wherein the bollard assembly further comprises a receiving arrangement for receiving and fastening a lateral side portion of the removable wall frame assembly.

16. The barrier system in accordance with claim 1 wherein the rigid base member is adapted to be permanently fastened to the underlying supporting surface.

17. The barrier system in accordance with claim 1 wherein the rigid base member comprises a guide opening positioned at one or both lateral ends of the channel to allow insertion of the bottom frame member of the removable wall assembly into the lower portion of the channel.

\* \* \* \* \*